(12) United States Patent
Shun

(10) Patent No.: US 7,798,315 B2
(45) Date of Patent: Sep. 21, 2010

(54) MODULAR ASSEMBLY

(76) Inventor: Shing-Hsieh Shun, P.O. Box 36-80, Taichung (TW)

( * ) Notice: Subject to any disclaimer, the term of this patent is extended or adjusted under 35 U.S.C. 154(b) by 349 days.

(21) Appl. No.: 12/011,111

(22) Filed: Jan. 24, 2008

(65) Prior Publication Data

US 2009/0188107 A1 Jul. 30, 2009

(51) Int. Cl.
*B65G 21/20* (2006.01)
(52) U.S. Cl. .................. 198/836.3; 198/861.1
(58) Field of Classification Search .......... 198/836.1, 198/836.2, 836.3, 860.1, 861.1
See application file for complete search history.

(56) References Cited

U.S. PATENT DOCUMENTS

| 4,562,921 | A | * | 1/1986 | Leemkuil et al. ............ 198/841 |
| 4,951,809 | A | * | 8/1990 | Boothe et al. ............... 198/841 |
| 5,782,339 | A | * | 7/1998 | Drewitz .................... 198/836.3 |
| 6,871,737 | B2 | * | 3/2005 | Ertel et al. ............... 198/860.1 |
| 7,207,432 | B2 | * | 4/2007 | Hama ...................... 198/750.1 |
| 2004/0118663 | A1 | * | 6/2004 | Gaeddert et al. ......... 198/861.1 |
| 2007/0034488 | A1 | * | 2/2007 | Chiu Chen .............. 198/861.1 |

* cited by examiner

Primary Examiner—James R Bidwell
(74) Attorney, Agent, or Firm—Charles E. Baxley

(57) ABSTRACT

A modular assembly comprises a fixing seat formed with a slot for receiving a positioning member of a moving seat, and a plurality of fastening elements for pressing the positioning member against an inner wall of the slot so that the moving seat is positioned in the fixing seat.

14 Claims, 7 Drawing Sheets

MODULAR ASSEMBLY

BACKGROUND OF THE INVENTION

1. Technical Field

The present invention relates to modularizing assemblies pertaining to manufacturing or processing mechanical devices. The modular assembly facilitates reducing the difficulty and complexity of assembling mechanical devices and stably positioning the mechanical devices so as to save designing and manufacturing costs for mechanical systems with different individualities.

2. Description of Related Art

Mechanical devices providing different functions may be arranged and assembled into a mechanical system that provides a particular systemic flow path and functions meeting practical needs. Later adjustment or rearrangement may be conducted to fit the assembled mechanical system for specific requirements of processing or manufacturing. Conventionally, existing stages, tracks, combining components and parts are typically adopted to realize the foregoing rearrangement or adjustment under consideration of saving expense of additional equipments. However, in repeated modifications, such existing equipments can consume considerable refitting costs. Moreover, repeated refitting and calibrating are time-consuming while the resultant "pieced-up" mechanical system is inferior in apparent integrity.

For example, a labeling machine at least comprises a conveying device, a label belt feeding device, a labeling device and a pressing device. In operation, a rolled-up label belt is installed in the label belt feeding device, and a plurality of objects to be labeled are transported successively on the conveying device. When a label is fed to the labeling device, one of the objects passing the labeling device is temporarily positioned at a labeling position so that the labeling device can accurately attach the label onto a surface of the object. Then, the label can be further fixed on the surface of the object under a pressure exerted by the pressing device. The devices of the label machine may be frequently rearranged and reassembled for fitting different label sizes, different object sizes, different label sites and so on. In addition, when more devices provide extra functions have to be added at the upstream, midstream and downstream segments of the systemic flow path. If the prior approach is implemented to deal with rearrangement and reassembly of the devices, the procrastinated production and the increased refitting cost may uneconomically happen.

SUMMARY OF THE INVENTION

The main objective of the present invention is to provide a modular assembly that removably combines mechanical devices so as to allow maneuverable arrangement and combination of mechanical devices with reduced assembling costs, convenient assembling, and lowered assembling complexity as well as difficulty and provides the resultant mechanical system with an apparent integrity.

A modular assembly comprises: at least one fixing seat formed with at least one slot thereon in which slot two sides adjacent to an opening thereof are formed as two opposite retaining portions and each of the retaining portion has a pressing surface at an inner side thereof, at least one positioning member, which is restricted in the slot by the retaining portion and has two propping surfaces corresponding to the two pressing surfaces, at least one moving seat, which has at least one combining portion in contact with the fixing seat, and at least one fastening elements, which penetrates and combines the combining portion and the positioning member so that when the fastening element is fastened, the propping surfaces of the positioning member press against the pressing surfaces of the slot and the combining portion presses against a surface of the fixing seat, thereby positioning the moving seat with respect to the fixing seat.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

While a preferred embodiment is provided herein for illustrating the concept of the present invention as described above, it is to be understood that the extent of deformation or displacement of the components in these drawings are made for better explanation and need not to be made in scale.

Figure 1:
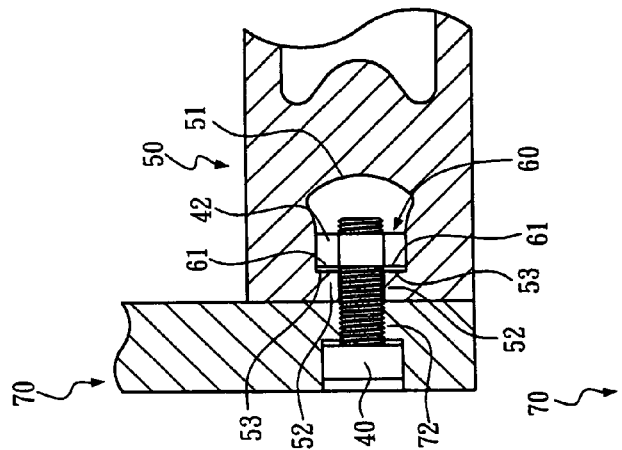
FIG. 1 is a sectional view of a modular assembly of the present invention, wherein a column made of engineering plastic is used as a positioning member, showing that a moving seat and a fixing seat are in loose fit.
Figure 3:
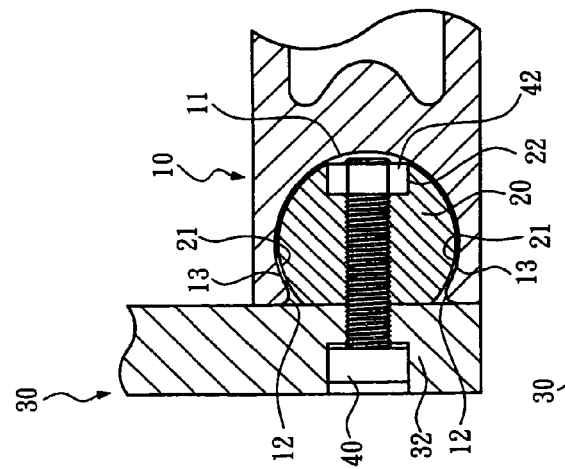
FIG. 3 is a sectional drawing of the modular assembly of the present invention, wherein a nut is used as the positioning member.

A modular assembly of the present invention is as shown in FIGS. 1 and 3, and comprises the following components.

At least one fixing seat 10 or 50 is formed thereon with at least one slot 11 or 51. The slot 11 or 51 is parallel to an axis of the fixing seat 10 or 50 and has its two sides adjacent to an opening thereof are formed as two opposite retaining portions 12 or 52. At least one of the retaining portions 12 or 52 has a pressing surface 13 or 53 at an inner side thereof.

At least one positioning member 20 or 60 is restricted in the slot 11 or 51 by the retaining portions 12 or 52. The positioning member 20 or 60 has two propping surfaces 21 or 61 corresponding to the two pressing surfaces 13 or 53.

At least one moving seat 30 or 70 has at least one combining portion 32 or 72 in contact with the fixing seat 10 or 20.

And at least one fastening element 40 penetrates the combining portion 32 or 72 and the positioning-member 20 or 60.

Figure 2:
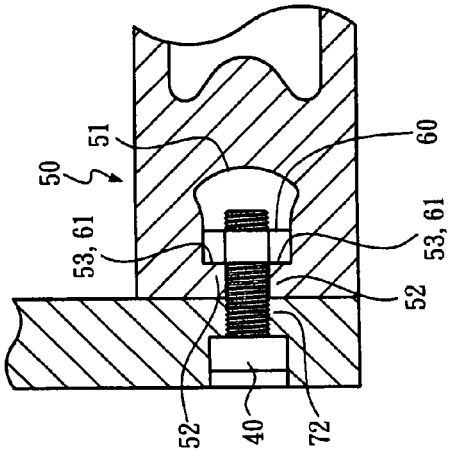
FIG. 2 is a sectional view of the modular assembly of the present invention, wherein the column made of engineering plastic is used as the positioning member, showing that the moving seat and the fixing seat are in close fit.
Figure 4:
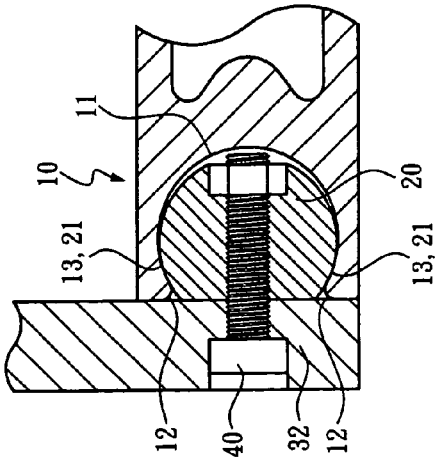
FIG. 4 is a sectional view of the modular assembly of the present invention, wherein the nut is used as the positioning member, showing that the moving seat and the fixing seat are in close fit.

Referring to FIGS. 2 and 4, when the fastening element 40 is fastened, the positioning member 20 or 60 and the combining portion 32 or 72 move toward each other so that the propping surfaces 21 or 61 of the positioning member 20 or 60 press against the pressing surfaces 13 or 15 of the slot 11 or 51 and the combining portion 32 or 72 of the moving seat 30 or 70 presses against a surface of the fixing seat 10 or 50, thereby positioning the moving seat 30 or 70 with respect to the fixing seat 10 or 50. On the contrary, referring to FIGS. 1 and 3, when the fastening element 40 is loosened, the close fit between the propping surfaces 21 or 61 of the positioning member 20 or 60 and the pressing surfaces 13 or 53 of the slot 11 or 51 is released so that the moving seat 30 or 70 can move along the fixing seat 10, 50.

The fixing seat 10 depicted in FIGS. 1 and 2 are made of aluminum alloy by a precise extrusion process. The positioning member 20 is formed as a column of engineering plastic. The slot 11 has a sectional shape substantially matching that of the positioning member 20. The positioning member 20 further has a nut receiving portion 22 for receiving a nut 42 that is screwedly coupled with the fastening element 40. The modular assembly provided in FIGS. 1 and 2 is applicable to a heavy-load structure.

As shown in FIGS. 3 and 4, the positioning member 60 is the nut 42 allowing the fastening element 40 to pass therethrough and couple therewith. Therefore, the modular assembly described in the two drawings is applicable to a light-load structure.

Figure 5:
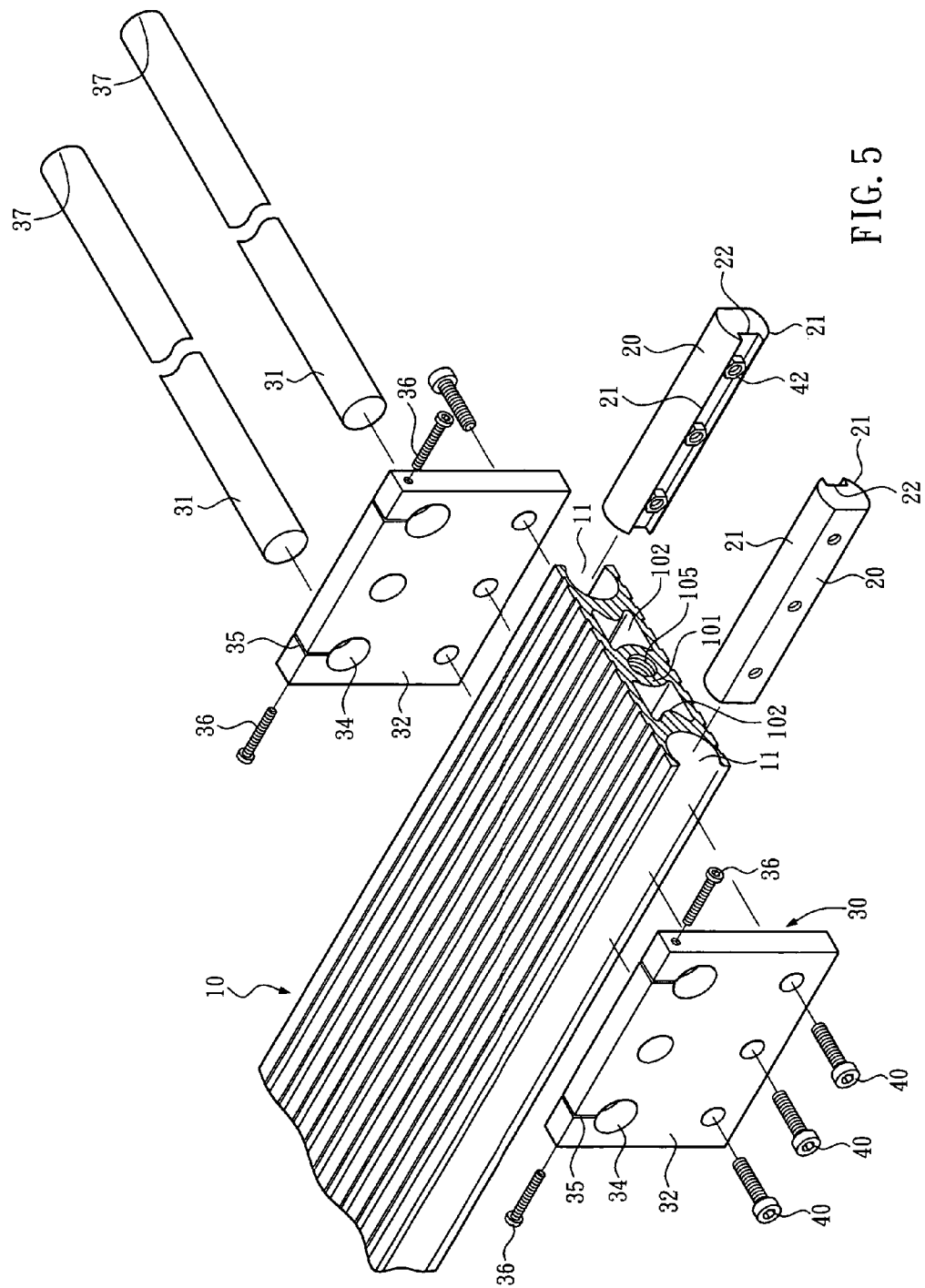
FIG. 5 is an exploded view of the modular assembly of the present invention, wherein the column made of engineering plastic is used as the positioning member, showing that the modular assembly is applied as a heavy-load structure.
Figure 6:
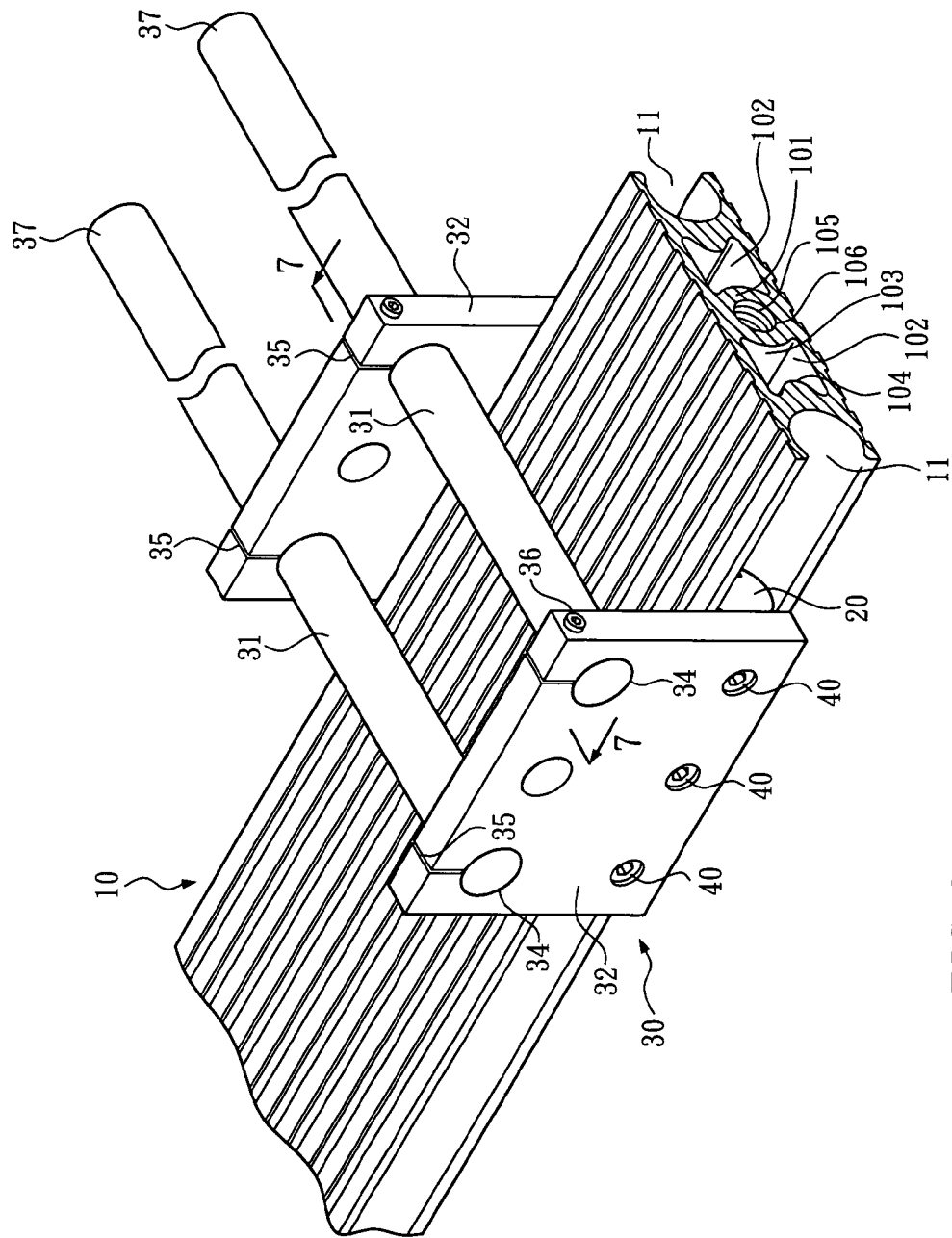
FIG. 6 is an assembly drawing of the modular assembly of the present invention, wherein the column made of engineering plastic is used as the positioning member, showing that the modular assembly is applied as the heavy-load assembly.
Figure 7:
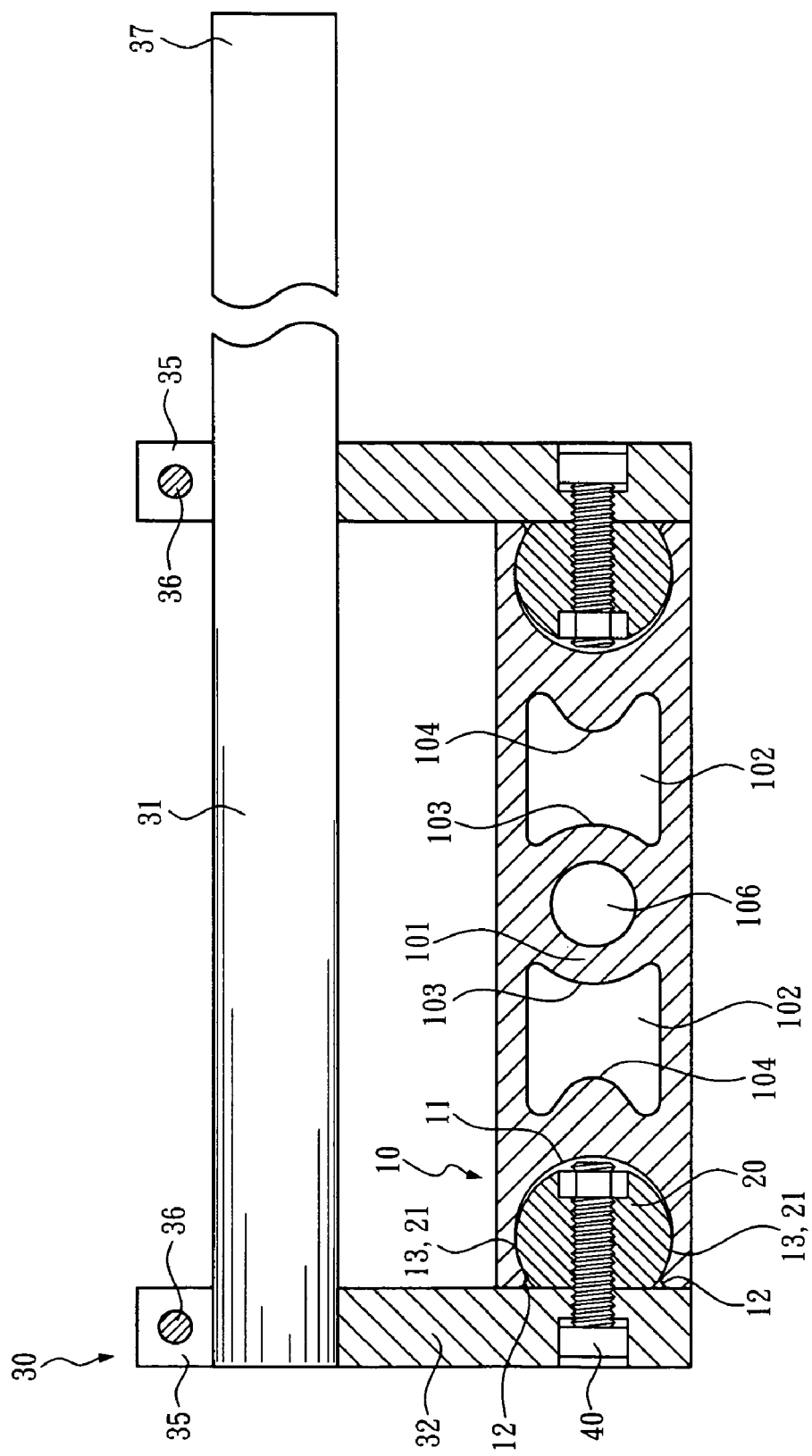
FIG. 7 is a sectional view taken along line 7-7 of FIG. 6.

FIGS. 5, 6 and 7 show the modular assembly described in FIGS. 1 and 2 embodied applied to a heavy-load structure. The fixing seat 10 comprises two sides parallel to the axis thereof formed with a respect said slot 11 and the columnar positioning members 20 made of engineering plastic are restricted in the slots 11. The moving seat 30 comprises two combining portion 32 and a bearing porting 31. The bearing portion 31 is embodied as two columns connected between the two combining portions 32. Each of the two combining portion 32 has a round hole 34 for receiving two ends of the bearing portion 31, respectively. The combining portion 32 further has an elongate notch 35 communicated to the round hole 34. A screw 36 is pierced in and coupled with the combining portion 32 for closing the notch 35 so as to fasten the bearing portion 31. The bearing portion 31 extends out from one side of the moving seat 30 for a predetermined length to serve as an assembling end 37 for being assembled with an external article as needs.

As shown in FIG. 7, the fixing seat 10 is made of aluminum alloy by a precise extrusion process. In addition to the slots 11 at the two sides thereof, a supporting wall 101 is formed at a center inside the fixing seat 10 and two channels 102 are formed at two sides of the supporting wall 101 in which an axial hole 106 is formed at a center of the supporting wall 101. The two sides of the supporting wall 101 and each of the channels has a side wall adjacent to the slot are formed as surfaces cambered toward the channels 102 for distributing a shearing stress. The axial hole 106 and the channels 102 help for reducing the weight of the fixing seat 10 and the walls 103, 104 function for distributing the shearing stress generated when the fixing seat 10 bears loads, thereby enhancing the structural strength of the fixing seat 10.

Figure 10:
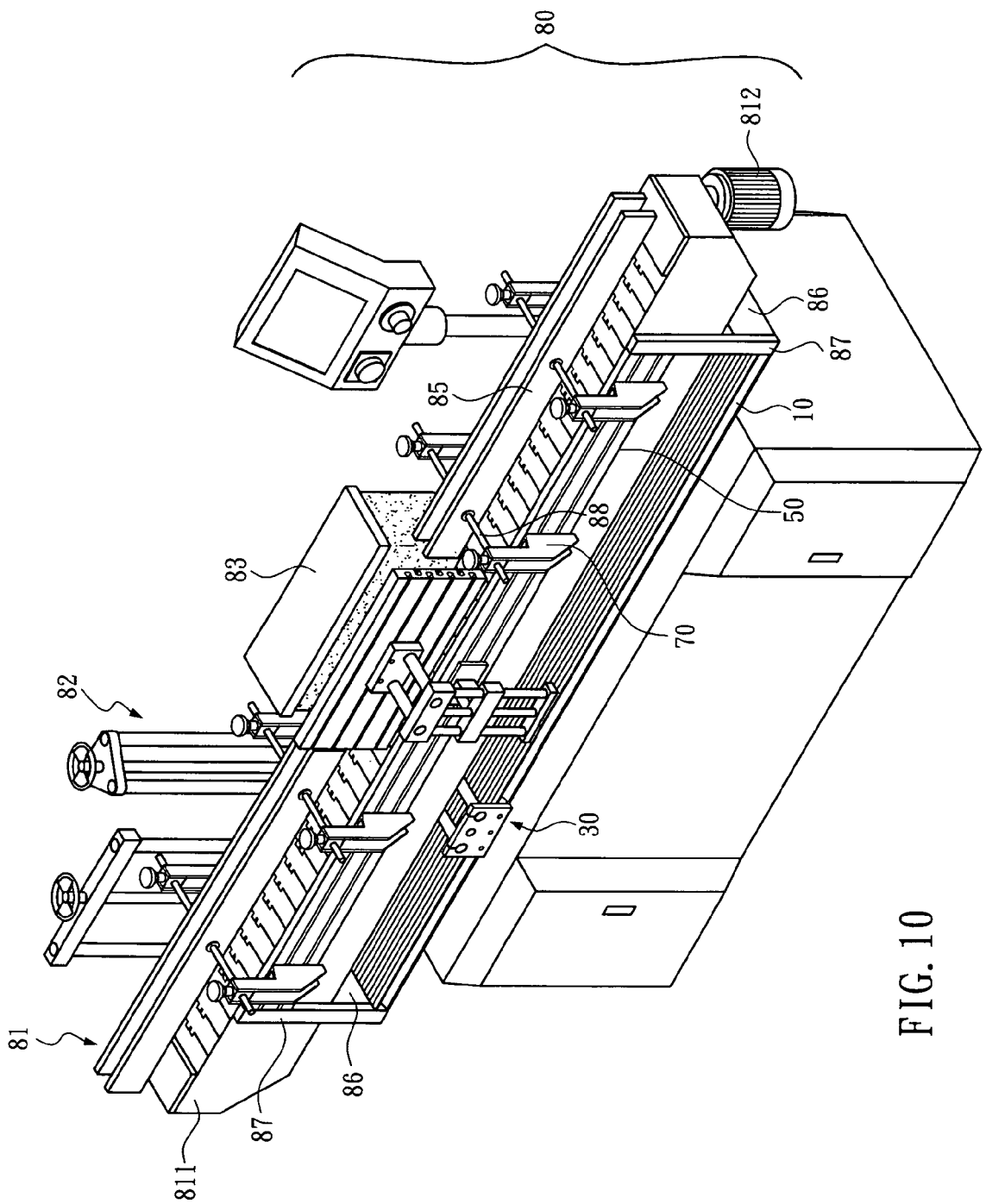
FIG. 10 shows the modular assemblies of the present invention are applied to a labeling machine.

Referring back to FIGS. 5 and 6, two ends of the axial hole 101 may be respectively formed with a threaded segment 105 for being pierced and coupled by a screw so that assembling boards 86, as shown in FIG. 10, can be affixed to two ends of the fixing seat 10.

Figure 8:
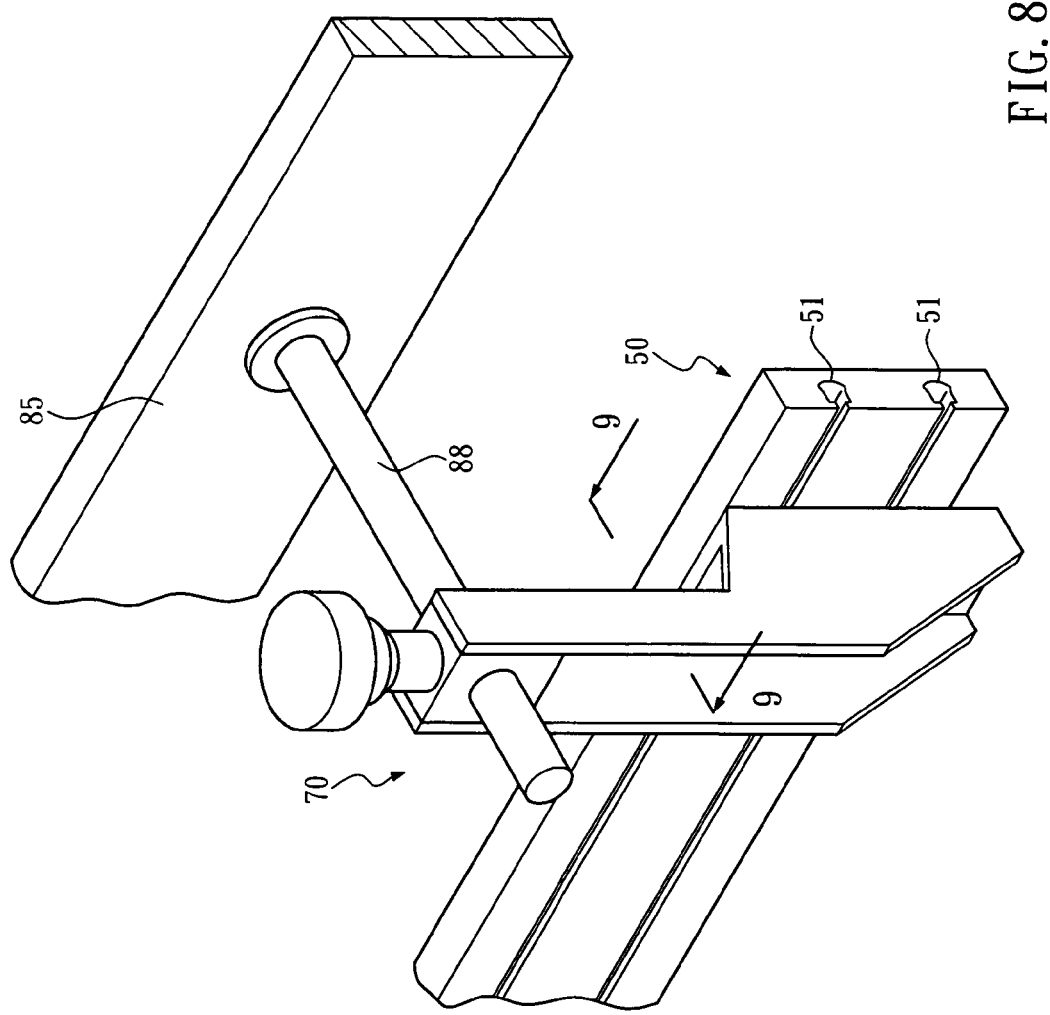
FIG. 8 is a perspective view of the modular assembly of the present invention, wherein the nut is used as the positioning member, showing that the modular assembly is applied as a light-load structure.
Figure 9:
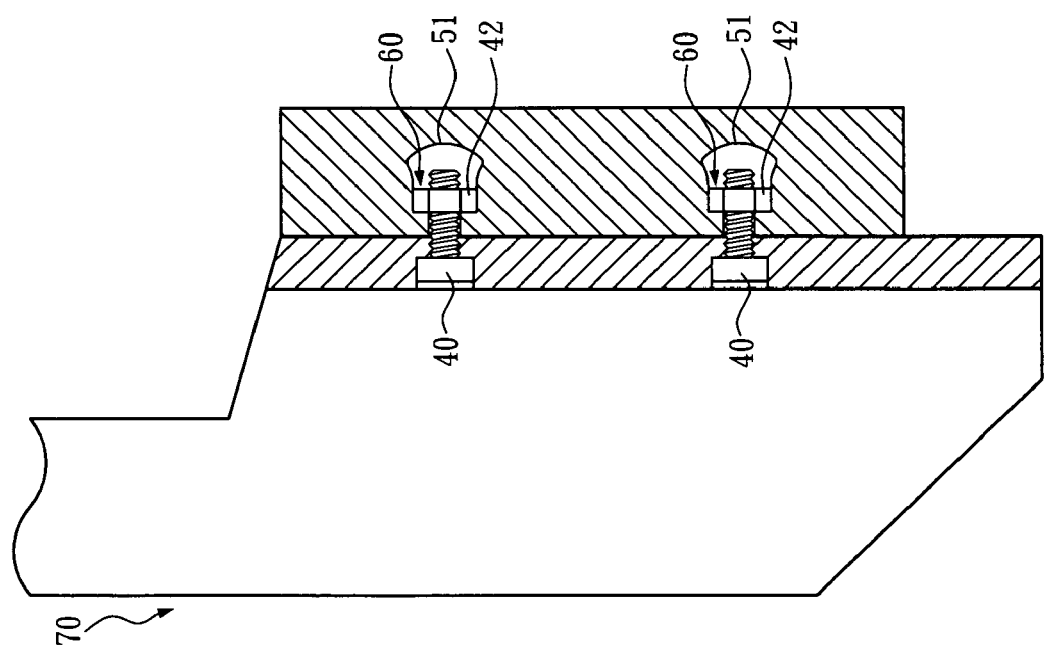
FIG. 9 is a sectional view taken along line 9-9 of FIG. 8.

FIGS. 8 and 9 show the modular assembly of FIGS. 3 and 4 applied to a light-load structure. The fixing seat 50 is provided with at least two slots 51 and the positioning members 60 in the form of the nuts 42 as described previously have been restricted in the slots 51. The moving seat 70 allows the fastening elements 40 to pass therethrough at positions thereon corresponding to the slots 51 so that the fastening elements 40 can be coupled with the nuts 42. The moving seat 70 may be combined with an external article as needed.

In FIG. 10, the modular assemblies of the present invention are now applied to a label machine. The labeling machine 80 comprises a conveying device 81 for transporting a plurality of objects to be labeled successively. A label belt feeding device 82 and a labeling device 83 are settled at either side of the conveying device 81. The label belt feeding device 82 positions a roll-ed-up label belt and sequentially fees labels to the labeling device 83. One of the objects passing the labeling device 83 is temporarily positioned at a labeling position so that the labeling device 83 can accurately attach the label onto a surface of the object.

The fixing seat 10 is settled below and parallel to the conveying device 81. Each of the two ends thereof is assembled with the assembling board 86 and the assembling board 86 is further equipped with a support unit 87 for supporting a conveying mechanism 811 of the conveying device 81. The assembling board 86 may also allow a power mechanism 812 pertaining to the conveying device 81 to be installed thereon. The moving seat 30 on the fixing seat 10 has the assembling ends 37 of its bearing portions 31 receiving the label belt feeding device 82, therefore realizing as a heavy-load structure. The moving seat 30 and the label belt feeding device 82 installed thereon can be moved to and positioned at a proper position as mentioned above. Two said fixing seats 50 are settled at two sides of the conveying mechanism 811 and the moving seat 70 on each of the fixing seat 50 is equipped with a supporting unit 88 that further combines with a retaining board 85, therefore realizing a light-load structure. The two retaining boards 85 are provided at the two sides of the conveying mechanism 811 for restricting the objects transported on the conveying mechanism 81.

In the event that the label machine is to be applied for operations with different label sizes, different object sizes, different label sites and so on, the devices thereof may thus be rearranged and reassembled or additional devices providing extra functions may be added at the upstream, midstream and downstream segments of the systemic flow path. At this time, the modular assemblies of the present invention allow convenient and maneuverable rearrangement and recombination of the devices and contribute an apparent integrity to the overall system.

Although the particular embodiments of the invention have been described in detail for purposes of illustration, it will be understood by one of ordinary skill in the art that numerous variations will be possible to the disclosed embodiments without going outside the scope of the invention as disclosed in the claims.

What is claimed is:

1. A modular assembly, comprising:
at least one fixing seat, which is formed with at least one slot, wherein two sides adjacent to an opening of the slot are respectively formed with a retaining portion that face each other and each of the retaining portions are formed with a pressing surface at an inner side thereof;

at least one positioning member, which is restricted in the slot by the retaining portion and has two propping surfaces corresponding to the two pressing surfaces;

at least one moving seat, which has at least one combining portion in contact with the fixing seat; and at least one fastening member, which pierces through the combining portion and the positioning member, whereby when the fastening member is fastened, the propping surfaces of the positioning member press against the pressing surfaces of the slot so that the combining portion presses against a surface of the fixing seat to position the moving seat with respect to the fixing seat wherein, the moving seat comprises two combining portions and a bearing portion connected between the two combining portions and wherein, the bearing portion is at least one column connected between the two combining portions.

2. The modular assembly as claimed in claim 1 wherein, the positioning member is formed as a column.

3. The modular assembly as claimed in claim 2, wherein, each of the positioning member and the combining portion of the moving seat has a contacting surface for contacting the other contacting surface.

4. The modular assembly as claimed in claim 2, wherein, the fastening member comprises a bolt and nut.

5. The modular assembly as claimed in claim 4, wherein, the positioning member has a nut receiving portion for receiving the nut.

6. The modular assembly as claimed in claim 1 wherein, the positioning member is a nut for being pierced and coupled by a fastening member.

7. The modular assembly as claimed in claim 1 wherein, the moving seat comprises two combining portions and a bearing portion connected between the two combining portions.

8. The modular assembly as claimed in claim 1 wherein, each of the two combining portions has a round hole for receiving a respective end of the bearing portion, an elongate notch communicated with the round hole, and a screw screwed onto the combining portion for closing the notch.

9. The modular assembly as claimed in claim 1 wherein, two columns are connected between the two combining portions and each of the two columns extends from one side of the moving seat for a predetermined length to serve as an assembling end.

10. A modular assembly, comprising:
at least one fixing seat, which is formed with at least one slot, wherein two sides adjacent to an opening of the slot are respectively formed with a retaining portion that face each other and each of the retaining portions are formed with a pressing surface at an inner side thereof;

at least one positioning member, which is restricted in the slot by the retaining portion and has two propping surfaces corresponding to the two pressing surfaces;

at least one moving seat, which has at least one combining portion in contact with the fixing seat; and at least one fastening member, which pierces through the combining portion and the positioning member, whereby when the fastening member is fastened, the propping surfaces of the positioning member press against the pressing surfaces of the slot so that the combining portion presses against a surface of the fixing seat to position the moving seat with respect to the fixing seat, wherein the fixing seat is made of aluminum alloy by a precise extrusion process, wherein, a supporting wall is formed at a center inside the fixing seat and two channels are formed at two sides of the supporting wall in which an axial hole is formed at a center of the supporting wall.

11. The modular assembly as claimed in claim 10 wherein, the two sides of the supporting wall are surfaces cambered toward the channels for distributing a shearing stress.

12. The modular assembly as claimed in claim 10 wherein, each of the channels has a side wall adjacent to the slot formed as a surface cambered toward the channel for distributing a shearing stress.

13. The modular assembly as claimed in claim 10 wherein, each of two ends of the axial hole is formed with a threaded segment.

14. A modular assembly, comprising:
at least one fixing seat, which is formed with at least one slot, wherein two sides adjacent to an opening of the slot are respectively formed with a retaining portion that face each other and each of the retaining portions are formed with a pressing surface at an inner side thereof;

at least one positioning member, which is restricted in the slot by the retaining portion and has two propping surfaces corresponding to the two pressing surfaces;

at least one moving seat, which has at least one combining portion in contact with the fixing seat; and at least one fastening member, which pierces through the combining portion and the positioning member, whereby when the fastening member is fastened, the propping surfaces of the positioning member press against the pressing surfaces of the slot so that the combining portion presses against a surface of the fixing seat to position the moving seat with respect to the fixing seat wherein, a supporting wall is formed at a center inside the fixing seat and two channels are formed at two sides of the supporting wall in which an axial hole is formed at a center of the supporting wall.

* * * * *